(12) United States Patent
Tai et al.

(10) Patent No.: US 11,524,258 B2
(45) Date of Patent: Dec. 13, 2022

(54) ADSORBENT MATERIAL MODULE, ADSORBENT MATERIAL STRUCTURE AND GAS FILTRATION MASK

(71) Applicant: Aura Material Inc., Hsinchu County (TW)

(72) Inventors: Chin-Chih Tai, Hsinchu County (TW); Hsin-Hung Pan, Yilan County (TW); Fang-Ching Chang, Tainan (TW)

(73) Assignee: Aura Material Inc., Hsinchu County (TW)

(*) Notice: Subject to any disclaimer, the term of this patent is extended or adjusted under 35 U.S.C. 154(b) by 344 days.

(21) Appl. No.: 16/885,268

(22) Filed: May 28, 2020

(65) Prior Publication Data
US 2020/0376426 A1    Dec. 3, 2020

(30) Foreign Application Priority Data

May 31, 2019   (TW) .................................. 108119053

(51) Int. Cl.
*B01D 53/04* (2006.01)
*A62B 23/02* (2006.01)
*B01J 20/28* (2006.01)

(52) U.S. Cl.
CPC .......... *B01D 53/0415* (2013.01); *A62B 23/02* (2013.01); *B01J 20/28011* (2013.01); *B01J 20/28042* (2013.01); *B01J 20/28095* (2013.01); *B01D 2253/34* (2013.01); *B01D 2259/4541* (2013.01); *B01J 2220/62* (2013.01)

(58) Field of Classification Search
CPC .... B01D 53/02; B01D 53/04; B01D 53/0415; B01D 2253/102; B01D 2253/34; B01D 2259/4541; A62B 23/02; B01J 20/28011; B01J 20/28042; B01J 20/28095; B01J 2220/62; Y02C 20/40
USPC ...... 96/121, 126, 131, 132, 154; 128/205.27
See application file for complete search history.

(56) References Cited

U.S. PATENT DOCUMENTS

| | | | | |
|---|---|---|---|---|
| 5,667,713 A | * | 9/1997 | Kuma | B01D 53/0407 428/116 |
| 5,733,451 A | * | 3/1998 | Goellner | F24F 3/1423 96/125 |
| 5,857,355 A | * | 1/1999 | Hwang | F25B 15/04 62/495 |
| 6,197,097 B1 | * | 3/2001 | Ertl | F24F 8/10 96/129 |
| 6,277,178 B1 | * | 8/2001 | Holmquist-Brown | A62B 23/02 128/206.28 |
| 8,747,528 B2 | * | 6/2014 | Hung | B01D 53/06 96/125 |

(Continued)

FOREIGN PATENT DOCUMENTS

| CN | 103877834 A | 6/2014 |
|---|---|---|
| TW | 301629 B | 4/1997 |

*Primary Examiner* — Frank M Lawrence, Jr.
(74) *Attorney, Agent, or Firm* — CKC & Partners Co., LLC

(57) ABSTRACT

An adsorbent material module includes a plurality of tubular adsorbent materials and a plurality of medium materials. Each of the tubular adsorbent materials includes at least one channel and at least one adsorbent layer. The adsorbent layer surrounds the at least one channel. The medium materials are coated on two ends of each of the tubular adsorbent materials, respectively, and the medium materials have a thermal conductivity function or an electrical conductivity function.

20 Claims, 14 Drawing Sheets

(56) References Cited

U.S. PATENT DOCUMENTS

| | | | | |
|---|---|---|---|---|
| 2014/0174295 A1* | 6/2014 | Tai | ............... | D01D 5/24 96/111 |
| 2015/0367280 A1* | 12/2015 | Shih | ............... | B01J 20/18 96/146 |
| 2016/0166978 A1* | 6/2016 | Tai | ............... | B01D 53/053 95/26 |

* cited by examiner

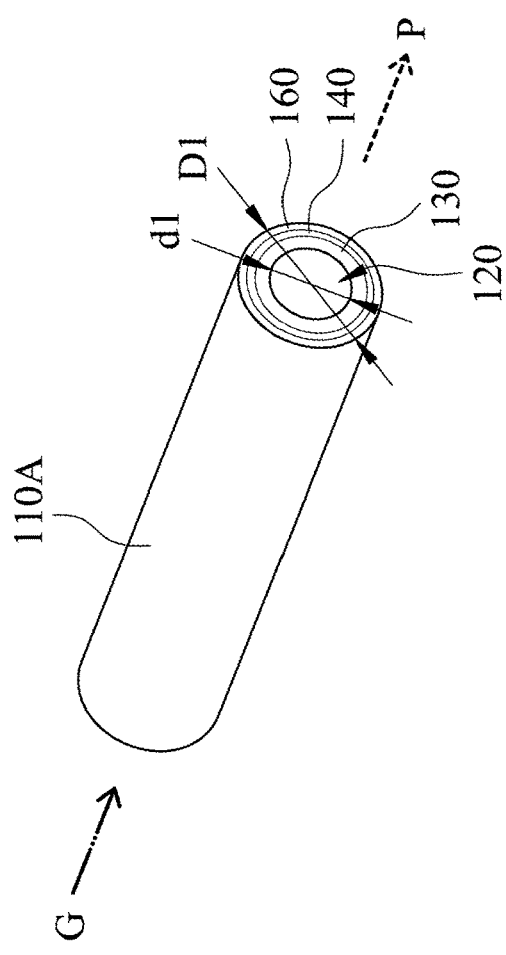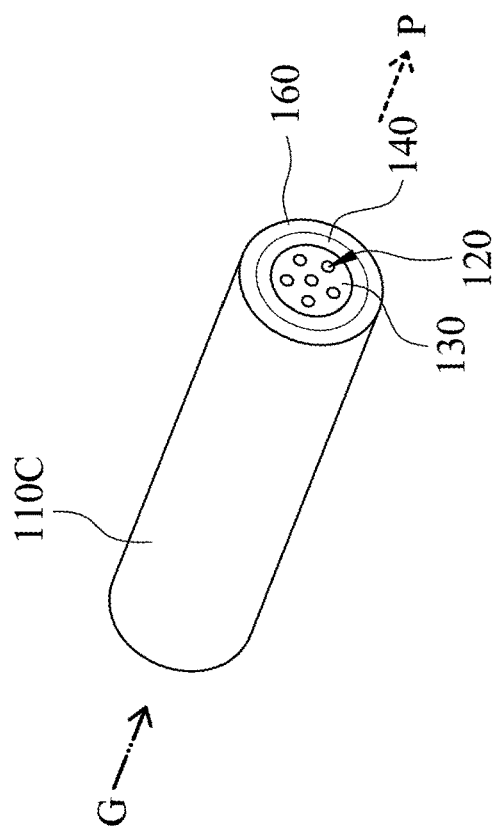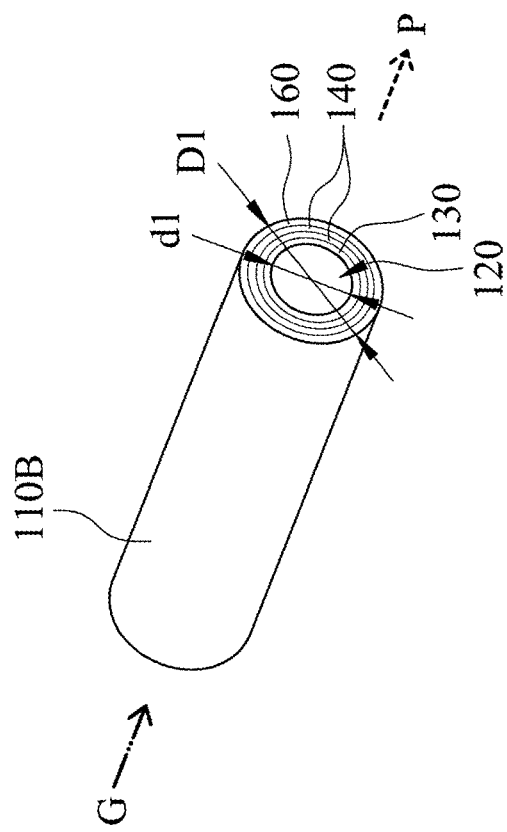
Fig. 3A
Fig. 3B
Fig. 3C

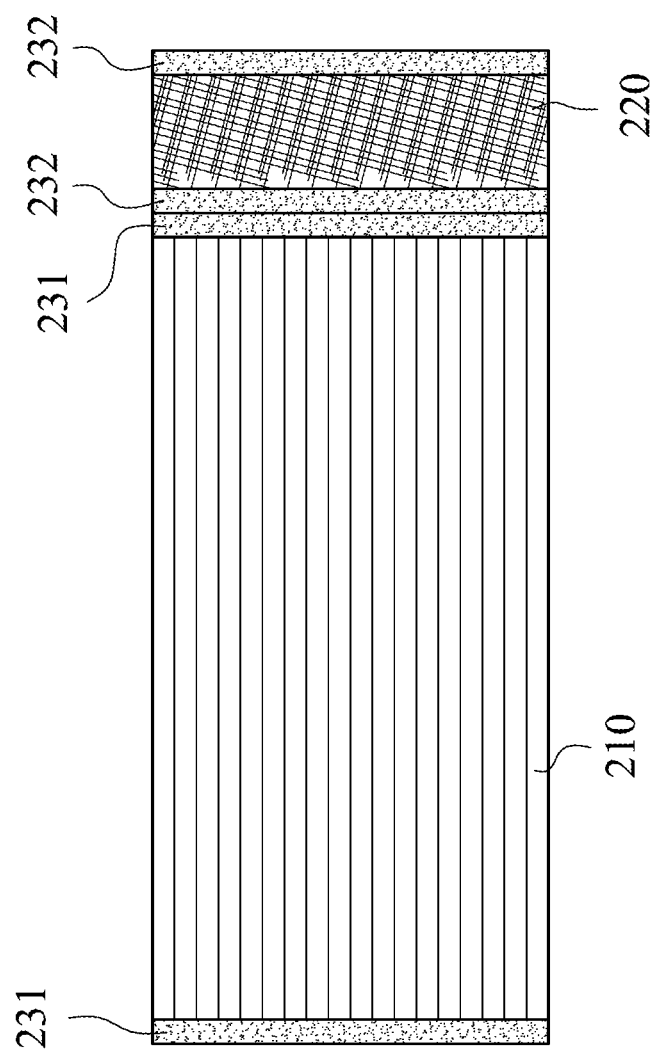

ADSORBENT MATERIAL MODULE, ADSORBENT MATERIAL STRUCTURE AND GAS FILTRATION MASK

RELATED APPLICATIONS

This application claims priority to Taiwan Application Serial Number 108119053, filed May 31, 2019, which is herein incorporated by reference.

BACKGROUND

Technical Field

The present disclosure relates to an adsorbent material module, an adsorbent material structure and a gas filtration mask. More particularly, the present disclosure relates to an adsorbent material module, an adsorbent material structure and a gas filtration mask with tubular adsorbent materials and fiber adsorbent materials.

Description of Related Art

The adsorbent material module mounted on the gas filtration facilities is often the key factor in determining the removal efficiency of gas filtration. However, the most popular adsorbent materials on the market are zeolite, silica gel and other porous adsorbent materials, and they are filled in the gas filtration facilities with the traditional granular type. The aforementioned filling method of the porous adsorbent materials is prone to cause high pressure drop, poor heat transfer efficiency, dusting and other problems, so that the energy consumption of the whole gas filtration facilities is increased and the efficiency thereof is reduced.

Therefore, it is important to develop an adsorbent material module which can improve the efficiency of the gas filtration.

SUMMARY

According to one aspect of the present disclosure, an adsorbent material module includes a plurality of tubular adsorbent materials and a plurality of medium materials. Each of the tubular adsorbent materials includes at least one channel and at least one adsorbent layer. The adsorbent layer surrounds the at least one channel. The medium materials are coated on two ends of each of the tubular adsorbent materials, respectively, and the medium materials have a thermal conductivity function or an electrical conductivity function.

According to another aspect of the present disclosure, an adsorbent material structure includes at least one first adsorbent material module and at least one second adsorbent material module, the second adsorbent material module is connected to the first adsorbent material module. The first adsorbent material module includes a plurality of tubular adsorbent materials which are arranged side by side, and each of the tubular adsorbent materials includes at least one channel and at least one first adsorbent layer. The first adsorbent layer surrounds the channel. The second adsorbent material module includes a plurality of fiber adsorbent materials which are winded and stacked to each other, wherein each of the fiber adsorbent materials includes at least one micro channel and at least one second adsorbent layer. The second adsorbent layer surrounds the micro channel. An outer diameter of each of the tubular adsorbent materials is greater than an outer diameter of each of the fiber adsorbent materials, and an arranging direction of the tubular adsorbent materials of the first adsorbent material module is perpendicular to an arranging direction of the fiber adsorbent materials of the second adsorbent material module.

According to further another aspect of the present disclosure, a gas filtration mask includes a wearing part and a cartridge. The cartridge has an accommodation space and is separately connected to the wearing part, and the cartridge includes the adsorbent material module according to the aforementioned aspect.

According to further another aspect of the present disclosure, a gas filtration mask includes a wearing part and a cartridge. The cartridge has an accommodation space and is separately connected to the wearing part, and the cartridge includes the adsorbent material structure according to the aforementioned aspect.

BRIEF DESCRIPTION OF THE DRAWINGS

The present disclosure can be more fully understood by reading the following detailed description of the embodiment, with reference made to the accompanying drawings as follows:

FIG. 3A is an enlarging schematic view of the tubular adsorbent material of FIG. 1A according to one embodiment of one aspect of the present disclosure.

FIG. 3B is an enlarging schematic view of a tubular adsorbent material of FIG. 1A according to another embodiment of one aspect of the present disclosure.

FIG. 3C is an enlarging schematic view of a tubular adsorbent material of FIG. 1A according to further another embodiment of one aspect of the present disclosure.

FIG. 7A is a side schematic view of the adsorbent material structure according to one embodiment of FIG. 4.

DETAILED DESCRIPTION

Figure 1:
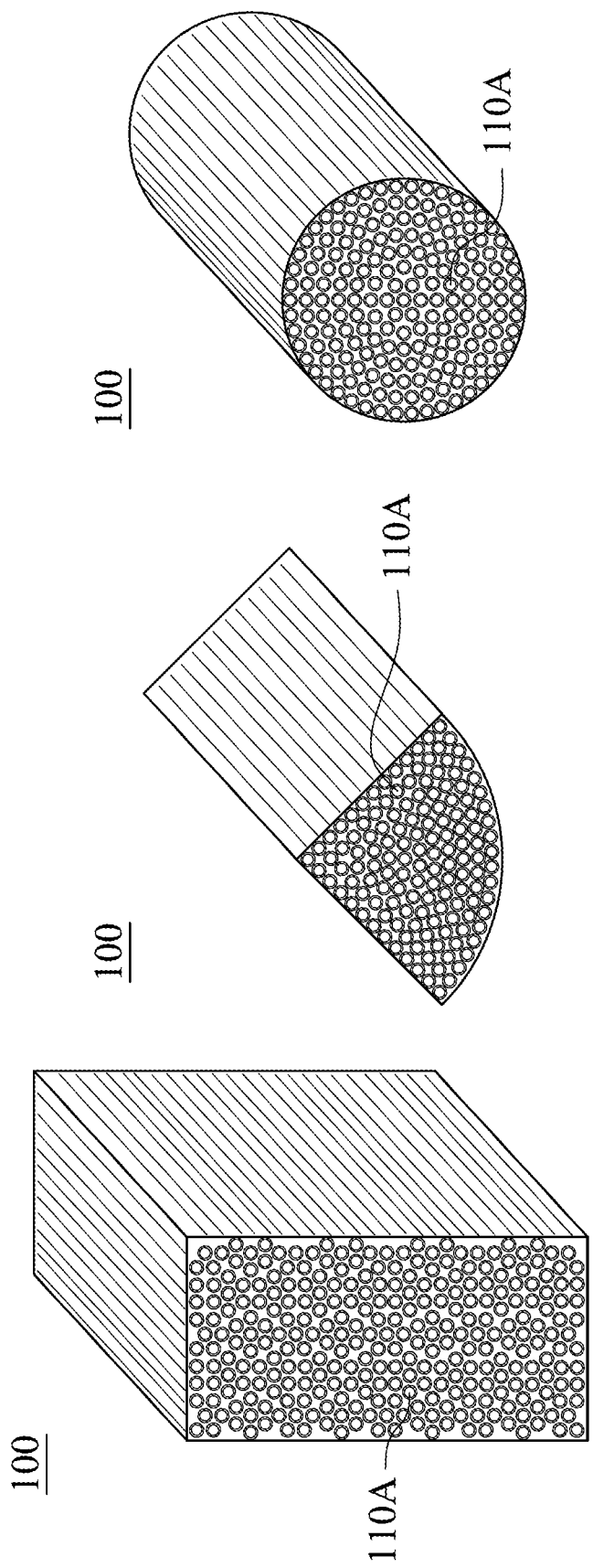
FIG. 1A is a schematic view of an adsorbent material module according to one embodiment of one aspect of the present disclosure.
FIG. 1B is a schematic view of an adsorbent material module according to another embodiment of the aspect of the present disclosure.
FIG. 1C is a schematic view of an adsorbent material module according to further another embodiment of the aspect of the present disclosure.
Figure 2:
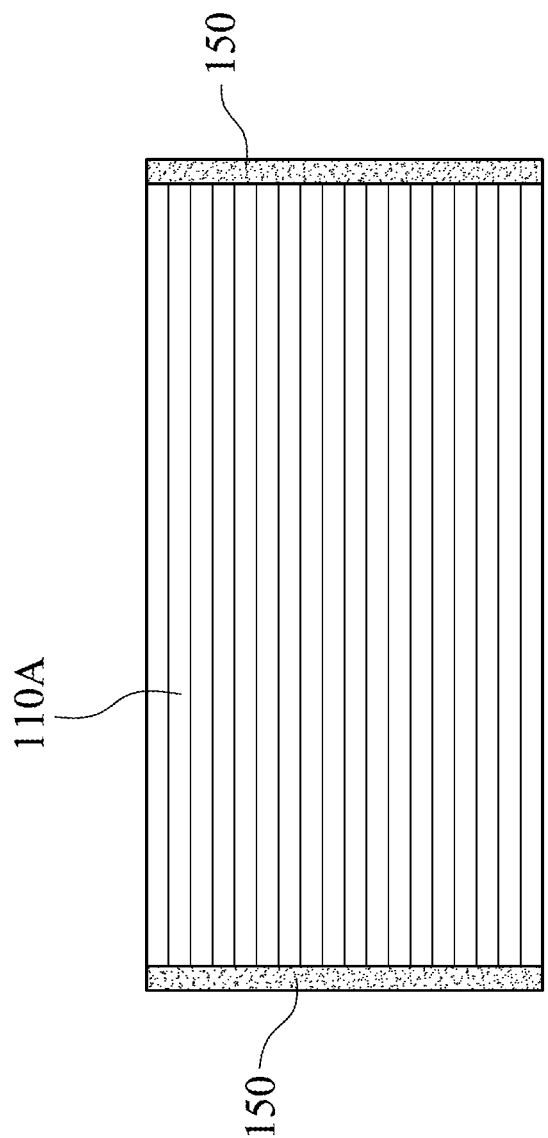
FIG. 2 is a side schematic view of the adsorbent material module of FIG. 1A.

FIG. 1A is a schematic view of an adsorbent material module 100 according to one embodiment of one aspect of the present disclosure. FIG. 2 is a side schematic view of the adsorbent material module 100 of FIG. 1A. FIG. 3A is an enlarging schematic view of a tubular adsorbent material 110A of FIG. 1A according to one embodiment of one aspect of the present disclosure. The adsorbent material module 100 includes a plurality of tubular adsorbent materials 110A and a plurality of medium materials 150. The medium materials 150 are coated on two ends of each of the tubular adsorbent materials 110A, respectively, and the medium materials 150 have a thermal conductivity function or an electrical conductivity function, that is, the medium materials 150 are located on two ends of the adsorbent material module 100. Each of the tubular adsorbent materials 110A includes at least one channel 120 and at least one adsorbent layer 130, and the adsorbent layer 130 surrounds the channel 120.

With the above arrangement, the adsorbent material module 100 can be a porous structure by arranging the plurality of tubular adsorbent materials 110A. When mixed gases G pass through the channels 120, the adsorbent layers 130 of the tubular adsorbent materials 110A adsorb a target gas of the mixed gases G. The tubular adsorbent materials 110A are uniformly distributed in the adsorbent material module 100, which can effectively reduce the pressure drop of the mixed gases G passed through the adsorbent material module 100, and improve the adsorption efficiency of the adsorbent material module 100.

The adsorbent material module 100 can be heated more evenly by including the medium materials 150, and the efficiency of the desorption and regeneration thereof can be improved. The medium materials 150 can be a material which is easy to conduct heat or electricity, such as alumina, silver, alloy, metal element or carbon-group materials, but the present disclosure will not be limited thereto.

In detail, the adsorbent layers 130 of the tubular adsorbent materials 110A can be made of an adsorbent material with high porosity. The porosity of the adsorbent layers 130 can be 20% to 80%, and the adsorbent layers 130 possess high specific surface area, which can be more than 2000 m²/m³. Therefore, the adsorbent material module 100 can exhibit high adsorption capacity and high desorption capacity, which can improve the efficiency of gas filtration of the adsorbent material module 100.

The adsorbent layer 130 of each of the tubular adsorbent materials 110A can be made of a boron-group material, a carbon-group material, a nitrogen-group material, an activated carbon, a 13X zeolite, a silica gel, an aerogel, a LiLSX molecular sieve, a carbon molecular sieve, a type A molecular sieve, a type X molecular sieve, a type Y molecular sieve, an activated alumina oxide, a high silica zeolite, a mesoporous silica zeolite, a metal-organic framework, a covalent organic framework, a metal oxide, a bentonite, a mordenite zeolite or a sepiolite. The adsorbent layers 130 can be made of any single of the above materials or the combination thereof according to the different operation requirements, but the present disclosure will not be limited thereto. Therefore, with the above adsorbent materials with high porosity, the adsorbent layers 130 can effectively adsorb different target gases according to the operation requirement, and the application field of the adsorbent material module 100 can be expanded. Specifically, the adsorbent material module 100 can be applied for adsorbing water, oxygen, nitrogen, carbon dioxide, VOCs, $CH_4$, $NO_x$, $SO_x$, $C_xF$, oil gas, ester or amines.

An inner diameter d1 of the channel 120 of each of the tubular adsorbent materials 110A can be 0.2 mm to 4.0 mm. Accordingly, the porosity of the adsorbent material module 100 can be increased, and the overall specific surface area of the adsorbent material module 100 can be increased, so that the adsorption efficiency thereof can also be improved.

Each of the tubular adsorbent materials 110A can further include at least one conductive layer 140. The conductive layer 140 surrounds the adsorbent layer 130, and the conductive layer 140 has a thermal conductivity function or an electrical conductivity function. The conductive layers 140 can be made of an activated carbon, a carbon black, a graphene, a graphite, a metal oxide or a metallic-based material. The conductive layers 140 can be made of any single of the above materials or the combination thereof, but the present disclosure will not be limited thereto, the user can select the conductive layers 140 with the thermal conductivity function or the electrical conductivity function according to the operation requirements. The tubular adsorbent materials 110A of the adsorbent material module 100 can be heated more evenly by arranging the conductive layers 140.

Further, each tubular adsorbent material 110A can include at least one insulating layer 160. The insulating layer 160 surrounds the conductive layer 140. The insulating layers 160 can be made of polymers, adsorbent materials or other insulating materials, but the present disclosure will not be limited thereto. Therefore, by the arrangement of the insulating layers 160, the stability of the tubular adsorbent materials 110A in use can be improved.

In the embodiment of FIG. 3A, the most inner layer of each tubular adsorbent material 110A is the adsorbent layer 130 which surrounds the channel 120, the conductive layer 140 surrounds the outer wall of the adsorbent layer 130, and the insulating layer 160 surrounds the outer wall of the conductive layer 140. It should be mentioned that, the arrangement order of the adsorbent layer 130, the conductive layer 140 and the insulating layer 160 can be adjusted according to the operation requirements, the present disclosure will not be limited thereto.

When the mixed gases G pass through the adsorbent material module 100, the adsorbent material module 100 processes the mixed gases G. In detail, the mixed gases G pass through the channel 120 of each of the tubular adsorbent materials 110A and contact with the adsorbent layer 130, the adsorbent layer 130 adsorbs the target gas of the mixed gases G, so as to produce the product gas P with low humidity or low concentration of the target gas, therefore, the purpose of gas filtration can be achieved.

When the adsorbent material module 100 reaches about saturation, the adsorbent material module 100 is heated to desorb and regenerate. By arranging the conductive layer 140, the adsorbent layer 130 of each of the tubular adsorbent materials 110A can be heated, so that the whole adsorbent material module 100 can be heated evenly. Therefore, the uneven heating condition of the particulate-filled adsorption bed can be efficiently solved, and the heat loss of the adsorbent material module 100 can be reduced.

In particular, the heating method can be selected according to material characteristics of the conductive layers 140 and the medium materials 150. For example, when the conductive layers 140 have the thermal conductivity function and the medium materials 150 also have the thermal conductivity function, the medium materials 150 coated on two ends of each of the tubular adsorbent materials 110A can be directly or indirectly heated by a heat source device (not shown), such as far-infrared heat source device, and the medium materials 150 can uniformly transfer the thermal energy to the conductive layers 140, then the conductive layers 140 directly transfer thermal energy to the adsorbent layers 130 by thermal conduction, so as to increase the temperature of the adsorbent layers 130, so that each of the tubular adsorbent materials 110A can be desorbed and regenerated. The adsorbent material module 100 can be heated indirectly or directly according to operation requirements and different heat source devices, therefore, the practicality of the adsorbent material module 100 can be enhanced.

On the other hand, when the conductive layers 140 have the electrical conductivity function and the medium materials 150 also have the electrical conductivity function, the medium materials 150 coated on two ends of each of the tubular adsorbent materials 110A can be connected to an electrode of a power supply device (not shown). The power supply device applies a voltage to the adsorbent material module 100, the medium materials 150 with the electrical conductivity function uniformly conducts electrical energy to the conductive layer 140 of each of the tubular adsorbent materials 110A, so as to increase the temperature of the conductive layer 140. Since the conductive layers 140 surrounding and contacting the adsorbent layers 130, the temperature of the adsorbent layers 130 can be uniform increased. Preferably, the electrical resistivity of the medium materials 150 with the electrical conductivity function can be 0.1 ohm/cm$^2$ to 10K ohm/cm$^2$. Therefore, the adsorbent material module 100 can be effectively and uniformly desorbed and regenerated.

With the arrangement of the conductive layers 140 and the medium materials 150, the adsorbent material module 100 not only can be heated more evenly to reduce the heat loss thereof, but also can quickly switch between heating and cooling, so that the efficiency of adsorption and desorption can be improved. Further, due to the characteristics of the adsorbent layers 130, the temperature of the desorption and regeneration can be 50° C. to 200° C., therefore, the energy consumption during heating the adsorbent material module 100 can be effectively reduced.

FIG. 3B is an enlarging schematic view of a tubular adsorbent material 110B of FIG. 1A according to another embodiment of one aspect of the present disclosure. The structure of the tubular adsorbent material 110B shown in FIG. 3B is similar to the structure of the tubular adsorbent material 110A shown in FIG. 3A, the structural relationship and configuration of the same structures, please refer to FIG. 3A, which will not be described again herein. In particular, the tubular adsorbent material 110B of FIG. 3B can include two conductive layers 140, one of the conductive layers 140 can have the thermal conductivity function, and the other conductive layers 140 can have the electrical conductivity function.

With the above configuration, the conductive layers 140 of the tubular adsorbent material 110B can be electrified or heated simultaneously or separately, so as to increase the temperature of the adsorbent layer 130 and that the tubular adsorbent material 110B can be desorbed and regenerated. Therefore, the tubular adsorbent material 110B can be heated or electrified according to the different operation requirements, so that the adsorbent material module 100 can be operated more flexibly.

FIG. 3C is an enlarging schematic view of a tubular adsorbent material 110C of FIG. 1A according to further another embodiment of one aspect of the present disclosure. The structure of the tubular adsorbent material 110C shown in FIG. 3C is similar to the structure of the tubular adsorbent material 110A shown in FIG. 3A, the structural relationship and configuration of the same structures, please refer to FIG. 3A, which will not be described again herein. In particular, the tubular adsorbent material 110C can include a plurality of channels 120. As shown in FIG. 3C, the channels 120 pass through the adsorbent layer 130. Therefore, the overall porosity of the adsorbent material module 100 can be increased, and the performance of adsorption and desorption of the adsorbent material module 100 can be further increased.

FIG. 1B is a schematic view of an adsorbent material module 100 according to another embodiment of the aspect of the present disclosure. FIG. 1C is a schematic view of an adsorbent material module 100 according to further another embodiment of the aspect of the present disclosure. As shown in FIGS. 1A to 1C, the tubular adsorbent materials 110A can be arranged or cut into different shapes as required, such as cuboid as shown in FIG. 1A, a fan cylinder as shown in FIG. 1B or a cylinder shown in FIG. 1C, but the present disclosure will not be limited thereto. The adsorbent material module 100 can be stacked by the plurality of tubular adsorbent materials 110A or cut into any shape to meet different operation requirements, and the adsorbent material module 100 can be operated more flexibly and can be applied in various fields.

It should be mentioned that, the application of the adsorbent material module 100 stacked by the tubular adsorbent materials 110A is widely. Due to the characteristics of high porosity and high specific surface area of the adsorbent material module 100, the adsorbent material module 100 can not only be applied for adsorbing the gas, but also can be applied for affecting the movement of molecules in the gas, and can be applied for sound absorption, sound insulation, sound frequency response or thermal insulation.

Figure 4:
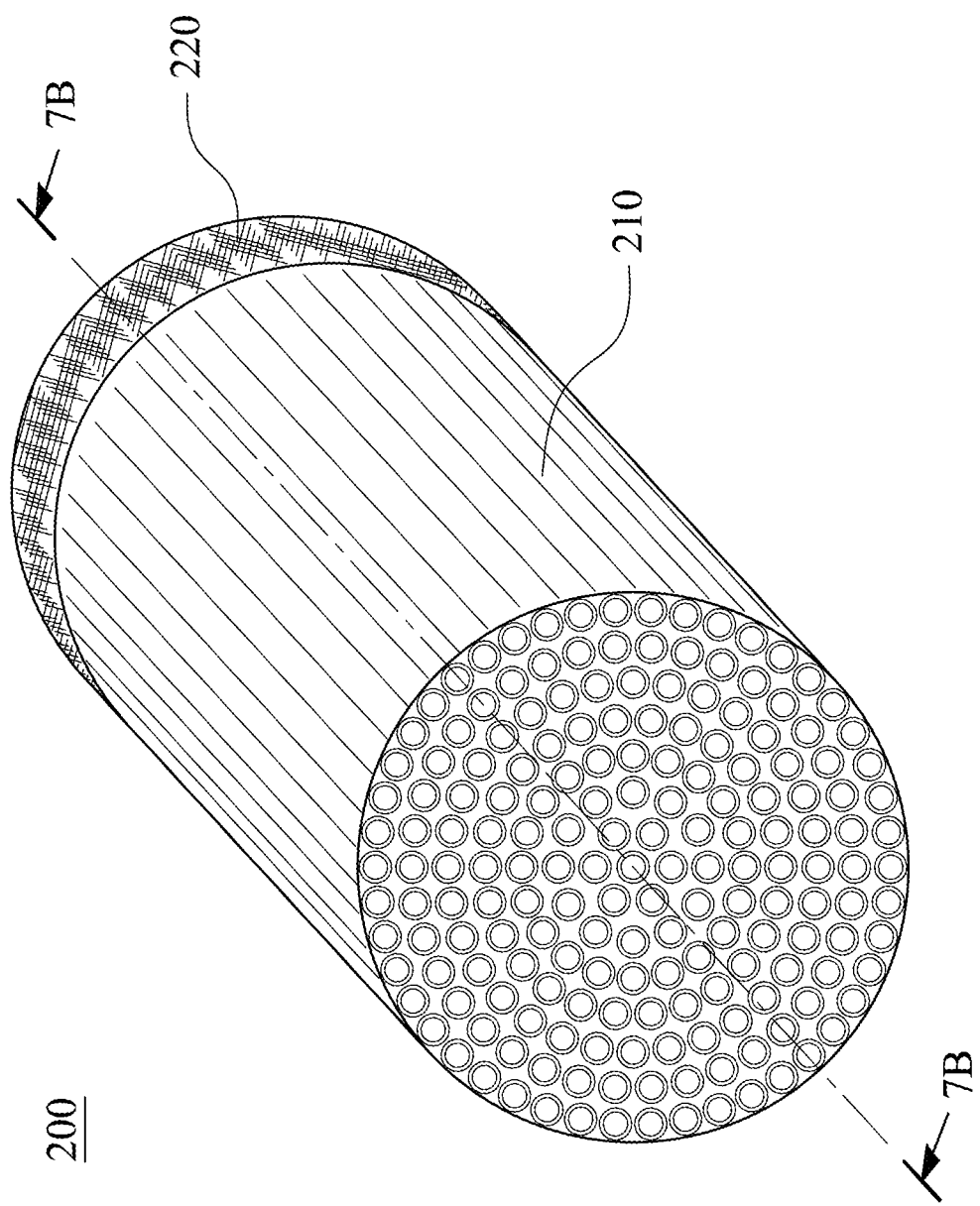
FIG. 4 is a schematic view of an adsorbent material structure according to one embodiment of another aspect of the present disclosure.
Figure 5:
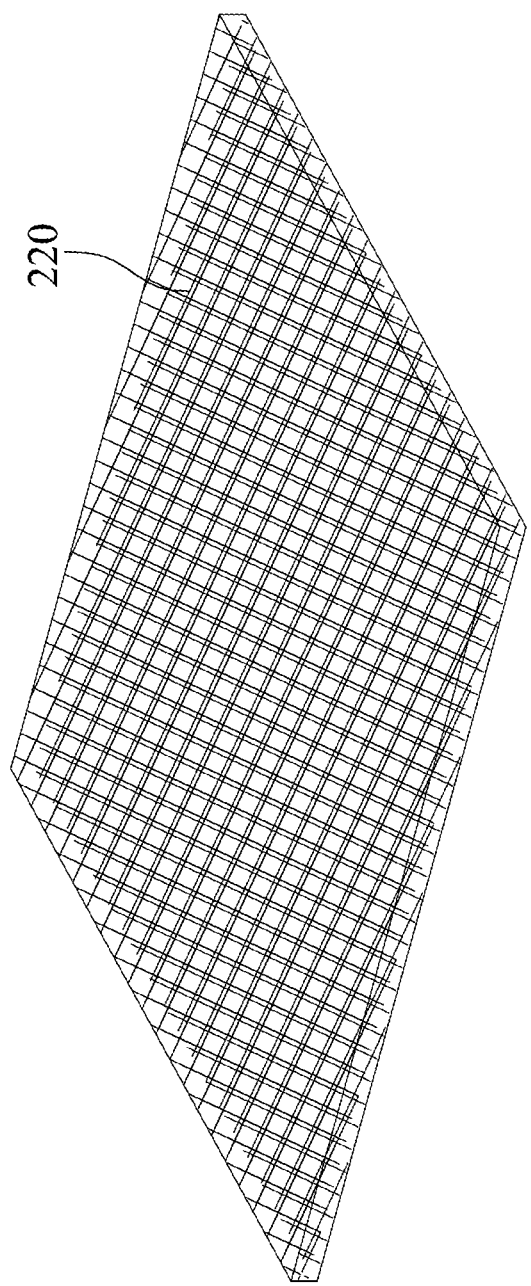
FIG. 5 is a schematic view of a second adsorbent material module of FIG. 4.
Figure 6B:
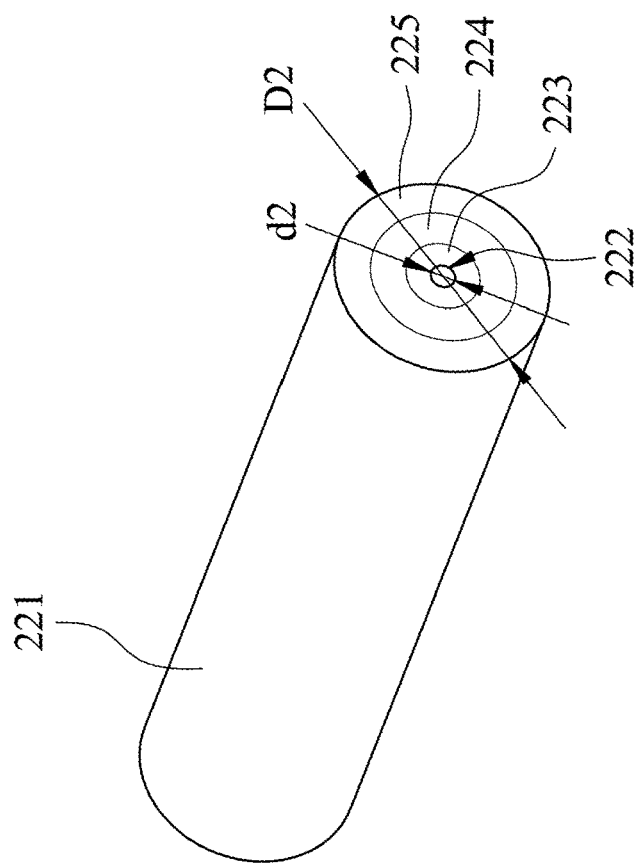
FIG. 6B is an enlarging schematic view of a fiber adsorbent material of a second adsorbent material module of FIG. 4.
Figure 6A:
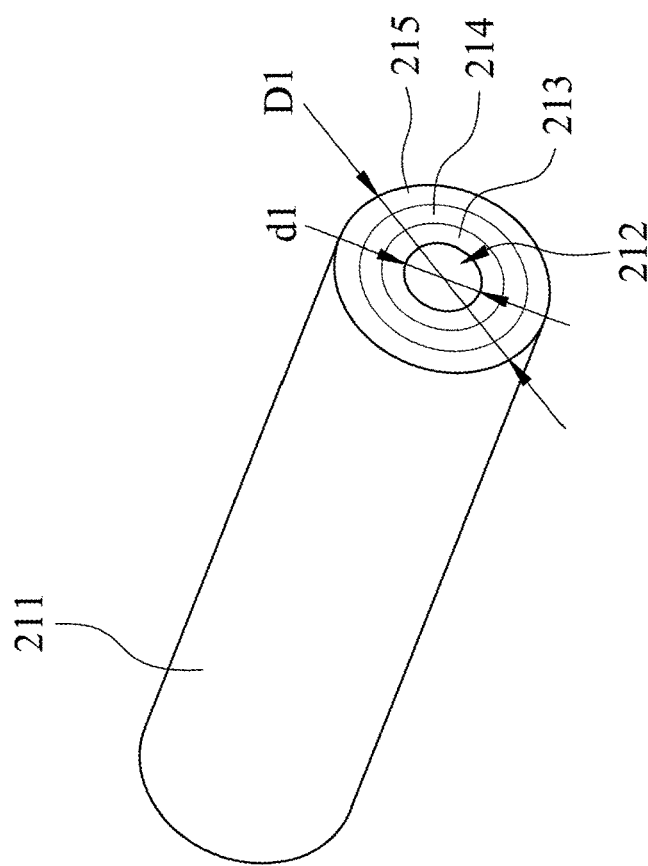
FIG. 6A is an enlarging schematic view of a tubular adsorbent material of a first adsorbent material module of FIG. 4.

FIG. 4 is a schematic view of an adsorbent material structure 200 according to one embodiment of another aspect of the present disclosure. FIG. 5 is a schematic view of a second adsorbent material module 220 of FIG. 4. FIG. 6A is an enlarging schematic view of a tubular adsorbent material 211 of a first adsorbent material module 210 of FIG. 4. FIG. 6B is an enlarging schematic view of a fiber adsorbent material 221 of a second adsorbent material module 220 of FIG. 4. The adsorbent material structure 200 include at least one first adsorbent material module 210 and at least one second adsorbent material module 220, and the second adsorbent material module 220 is connected to the first adsorbent material module 210. The first adsorbent material module 210 includes a plurality of tubular adsorbent materials 211 which are arranged side by side, and the second adsorbent material module 220 includes a plurality of fiber adsorbent materials 221 which are wound and stacked to each other.

As shown in FIG. 6A, each of the tubular adsorbent materials 211 of the first adsorbent material module 210 includes at least one channel 212 and at least one first adsorbent layer 213, and the first adsorbent layer 213 surrounds the channel 212. Further, as shown in FIG. 6B, each of the fiber adsorbent materials 221 of the second adsorbent material module 220 includes at least one micro channel 222 and at least one second adsorbent layer 223, and the second adsorbent layer 223 surrounds the micro channel 222. An outer diameter D1 of each of the tubular adsorbent materials 211 is greater than an outer diameter D2 of each of the fiber adsorbent materials 221.

With the above configuration, the efficiency of filtration of the adsorbent material structure 200 can be improved, and the adsorbent material structure 200 can adsorb different gas molecules or intercept and capture particles of different sizes or types, thus, the application and the practicality of the adsorbent material structure 200 can be increased.

Specifically, the structure of the fiber adsorbent materials 221 of the second adsorbent material module 220 is similar to the structure of the tubular adsorbent materials 211 of the first adsorbent material module 210, and further, the structure of the tubular adsorbent materials 211 of the first adsorbent material module 210 can be similar to the structure of the tubular adsorbent materials 110A of FIG. 3A, therefore, the structural relationship and configuration of the same components, please refer to the tubular adsorbent material 110A of FIG. 3A, which will not be described again herein.

The size of the fiber adsorbent material 221 is different from the size of the tubular adsorbent material 211. In detail, an inner diameter d1 of the channel 212 of each of the tubular adsorbent materials 211 can be 0.2 mm to 4.0 mm, and an inner diameter d2 of the micro channel 222 of each of the fiber adsorbent materials 221 can be 0.01 mm to 0.2 mm. Further, an outer diameter of each of the tubular adsorbent materials 211 is D1, an outer diameter of each of the fiber adsorbent materials 221 is D2, and D1/D2>3. With the arrangement of the tubular adsorbent materials 211 and the fiber adsorbent materials 221 of different sizes, the adsorbent material structure 200 can adsorb and intercept different sizes and types of substances.

Specifically, as shown in FIGS. 6A and 6B, each of the tubular adsorbent materials 211 includes the channel 212, the first adsorbent layer 213, a first conductive layer 214 and a first insulating layer 215, and each of the fiber adsorbent materials 221 includes the micro channel 222, the second adsorbent layer 223, a second conductive layer 224 and a second insulating layer 225.

The first adsorbent layer 213 and the second adsorbent layer 223 can be made of a boron-group material, a carbon-group material, a nitrogen-group material, an activated carbon, a 13X zeolite, a silica gel, an aerogel, a LiLSX molecular sieve, a type A molecular sieve, a type X molecular sieve, a type Y molecular sieve, an activated alumina oxide, a high silica zeolite, a mesoporous silica zeolite, a metal-organic framework, a covalent organic framework, a metal oxide, a bentonite, a mordenite zeolite or a sepiolite. As the above materials, the first adsorbent material module 210 and the second adsorbent material module 220 can be applied for adsorbing water, oxygen, nitrogen, carbon dioxide, VOCs, $CH_4$, $SO_x$, $C_xF$, oil gas, ester or amines.

Further, the porosities of the first adsorbent layers 213 and the second adsorbent layers 223 can be 20% to 80%, and the first adsorbent layers 213 and the second adsorbent layers 223 possess high specific surface area, which can be more than 2000 $m^2/m^3$. Therefore, the first adsorbent material module 210 and the second adsorbent material module 220 can exhibit high adsorption capacity and high desorption capacity, which can improve the filtration efficiency of the adsorbent material structure 200.

The first conductive layers 214 and the second conductive layers 224 can have a thermal conductivity function or an electrical conductivity function. The first conductive layers 214 and the second conductive layers 224 can be made of an activated carbon, a carbon black, a graphene, a graphite, a metal oxide or a metallic-based material. The first conductive layers 214 and the second conductive layers 224 can be made of any single of the above materials or the combination thereof, but the present disclosure will not be limited thereto. With the arrangements of the first conductive layers 214 and the second conductive layers 224, the first adsorbent material module 210 and the second adsorbent material module 220 can be heated more evenly, and the efficiency of desorption and regeneration of the first adsorbent material module 210 and the second adsorbent material module 220 can be increased.

The first insulating layers 215 and the second insulating layers 225 can be made of polymers, adsorbent materials or other insulating materials, but the present disclosure will not be limited thereto. Therefore, with the arrangement of the first insulating layers 215 and the second insulating layers 225, the stability of the first adsorbent material module 210 and the second adsorbent material module 220 in use can be improved.

It should be mentioned that, the structure of the tubular adsorbent material 211 and the fiber adsorbent material 221 can be also similar to the structure of the tubular adsorbent material 110B in FIG. 3B or the structure of the tubular adsorbent material 110C in FIG. 3C, the user can configure the structure of the tubular adsorbent material 211 and the fiber adsorbent material 221 according to the operation requirements, and the present disclosure will not be limited thereto.

On the other hand, as shown in FIG. 5, the second adsorbent material module 220 includes the fiber adsorbent materials 221 which are winded and stacked to each other, and the second adsorbent material module 220 can be a woven fabric structure or non-woven fabric structure. The fiber adsorbent materials 221 are interwoven with each other, therefore, the adsorption efficiency of the second adsorbent material module 220 can be increased. Further, the fiber adsorbent materials 221 can be a solid structure or a hollow structure. When the fiber adsorbent materials 221 is the solid structure, since the fiber adsorbent materials 221 interwoven with each other, the second adsorbent material module 220 can be formed a plurality of pores to adsorb the gas or intercept the particles; when the fiber adsorbent materials 221 is the hollow structure, the micro channels 222 would further enhance the surface area of the second adsorbent material module 220 and improve the performance of the filtration.

Further, as shown in FIG. 4, an arranging direction of the tubular adsorbent materials 211 of the first adsorbent material module 210 is perpendicular to an arranging direction of the fiber adsorbent materials 221 of the second adsorbent material module 220. In other words, the channels 212 of the tubular adsorbent materials 211 and the micro channels 222 of the fiber adsorbent materials 221 face to different directions. Therefore, the adsorbent material structure 200 can effectively adsorb or intercept the target substances from different directions.

The first adsorbent material module 210 can be stuck with the second adsorbent material module 220 by the adhesive material (not shown), or be stacked with each other, the user can connect the two in different ways according to the operation requirements, and the present disclosure will not be limited thereto.

Figure 7B:
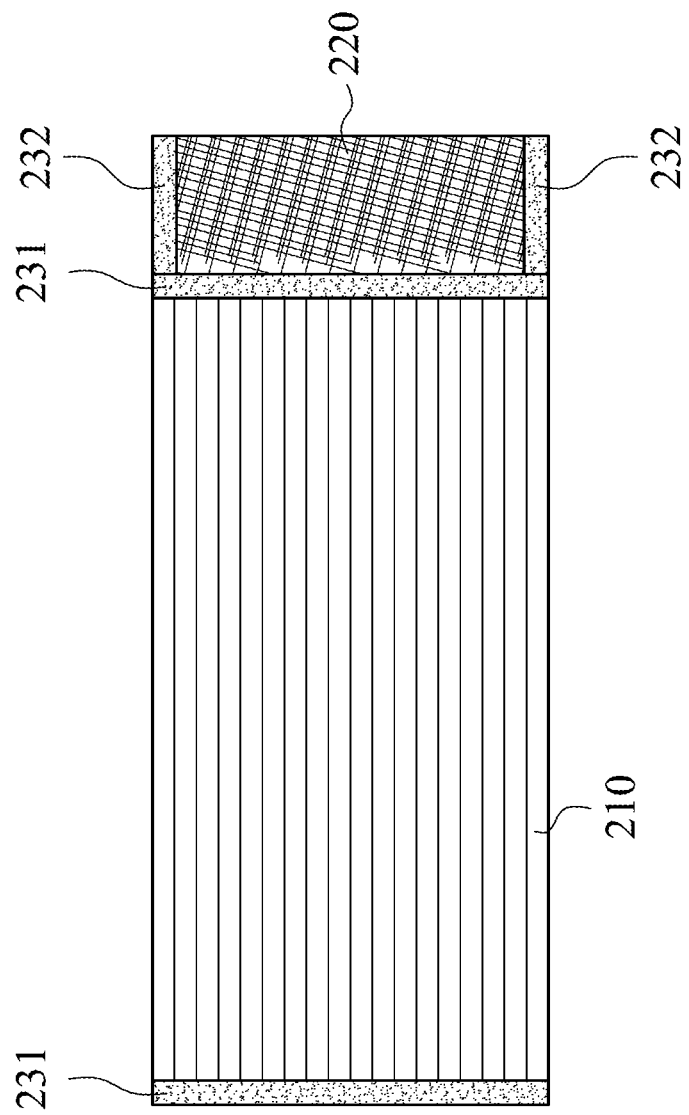
FIG. 7B is a sectional view along line 7B-7B of the adsorbent material structure according to another embodiment of FIG. 4.

FIG. 7A is a side schematic view of the adsorbent material structure 200 according to one embodiment of FIG. 4. FIG. 7B is a sectional view along line 7B-7B of the adsorbent material structure 200 according to another embodiment of FIG. 4. The first adsorbent material module 210 can further include a plurality of first medium materials 231 coated on two ends of the first adsorbent material module 210, that is, the first medium materials 231 are coated on two ends of each of the tubular adsorbent materials 211. The second adsorbent material module 220 can further includes a plurality of second medium materials 232 coated on an outer surface of the second adsorbent material module 220. The first medium materials 231 and the second medium materials 232 can have a thermal conductivity function or an electrical conductivity function. The first medium materials 231 and the second medium materials 232 can be materials which are easy to conduct heat or electricity, such as alumina, silver, alloy, metal element or carbon-group materials, but the present disclosure will not be limited thereto. It should be mentioned that, the first medium materials 231 and the second medium materials 232 are similar to the structure of the medium materials 150 in FIG. 2, the structural relationship and configuration of the same structures, please refer to FIG. 2, which will not be described again herein.

With the arrangement of the first medium materials 231 and the second medium materials 232, the first adsorbent material module 210 and the second adsorbent material module 220 can be heated more efficiently, and the whole adsorbent material structure 200 can be heated more evenly, so that the efficiency of desorption and regeneration of the adsorbent material structure 200 can be increased.

Specifically, in the embodiment of FIG. 7A, the second medium materials 232 can be coated on a surface of the second adsorbent material module 220 contacted with the first adsorbent material module 210 and an opposite surface thereof, and as shown in FIG. 7A, a coating position of the second medium materials 232 can be parallel to a coating position of the first medium materials 231. On the other hand, in the embodiment of FIG. 7B, the second medium materials 232 can be coated around a side surface of the second adsorbent material module 220, and as shown in FIG. 7B, a coating position of the second medium materials 232 can be perpendicular to a coating position of the first medium materials 231. It should be mentioned that the coating positions of the first medium materials 231 and the second medium materials 232 can be arranged according to the operation requirements, so as to meet the different operation conditions, and the present disclosure will not be limited thereto.

It should be mentioned that due to the characteristics of high porosity and high specific surface area of the adsorbent material structure 200, the adsorbent material structure 200 can not only be applied for adsorbing the gas, the adsorbent material structure 200 but also can be used for affecting the movement of molecules in the gas, and can be applied for sound absorption, sound insulation, sound frequency response or thermal insulation.

Figure 8:
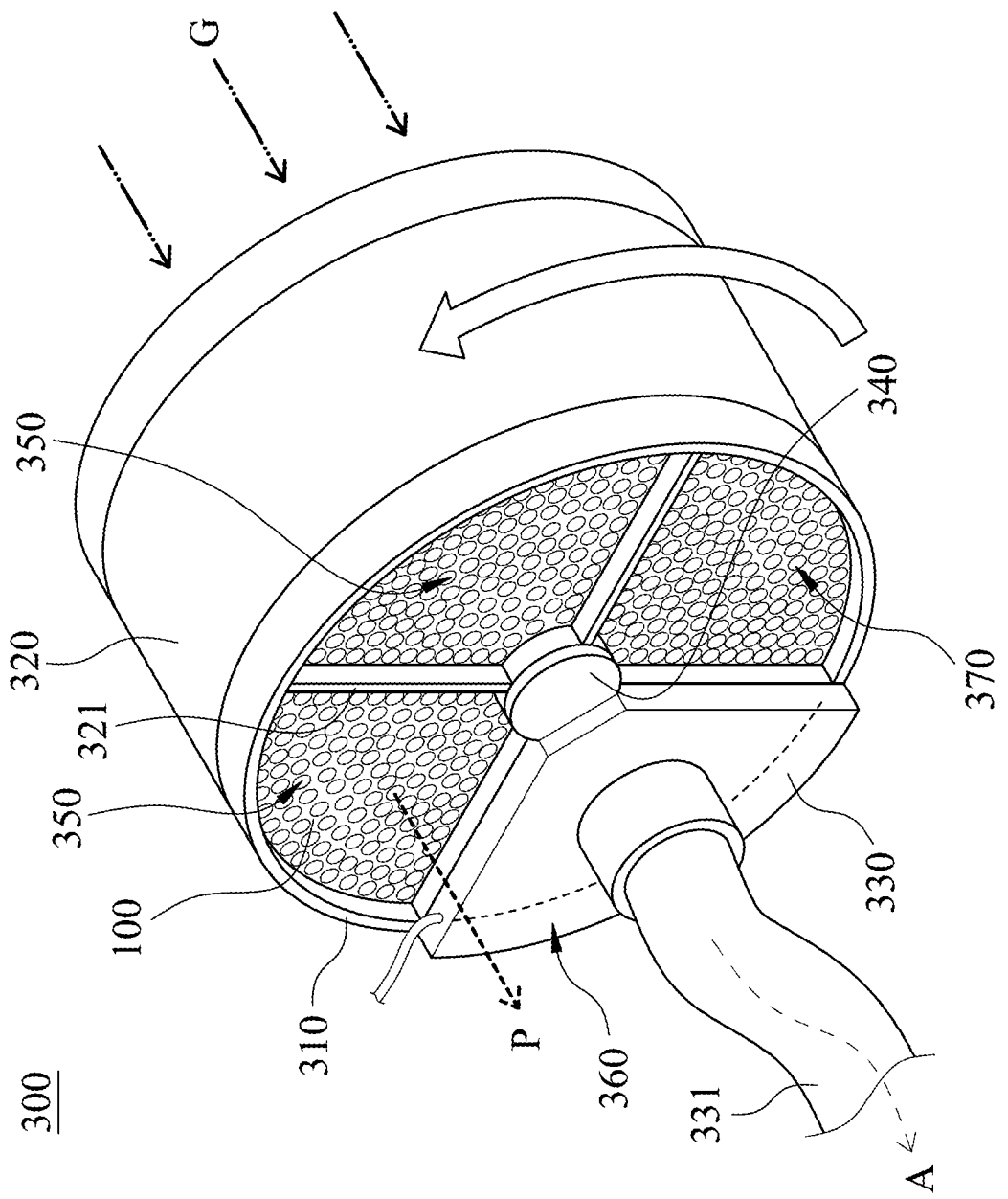
FIG. 8 is a schematic view of an adsorption device according to one embodiment of still another aspect of present disclosure.

FIG. 8 is a schematic view of an adsorption device 300 according to one embodiment of still another aspect of present disclosure. The adsorption device 300 is a rotary adsorption device and includes a plurality of adsorbent material modules 100 trimmed or arranged in a fan cylinder (as shown in FIG. 1B). Each of the adsorbent material modules 100 is separated into different areas by a plurality of partition plates 321, and each of the areas is defined as an adsorption area 350, a desorption area 360 and a pre-cooling area 370. Therefore, the adsorbent material modules 100 of the adsorption device 300 can proceed with an adsorption action, a desorption and regeneration action and a cooling action at the same time or separately, so that the practicality of the adsorption device 300 can be increased.

It should be mentioned that, in another aspect, the adsorption device 300 can also include the adsorbent material structure 200 in FIG. 4, the user can select or configure according to the operation requirements, and the present disclosure will not be limited thereto. The adsorption device 300 including the adsorbent material modules 100 will be described as an example below.

Specifically, the adsorption device 300 can be rotated by a wheel axle 340, and one of the adsorbent material modules 100 is sequentially rotated to the adsorption area 350, the desorption area 360 and the pre-cooling area 370 according to a direction shown by the arrow (its reference numeral is omitted).

When the mixed gases G enter the adsorption device 300 and pass through the adsorption area 350, the one of the adsorbent material modules 100 located in the adsorption area 350 would adsorb the target gas and generate the product gas P. When the one of the adsorbent material module 100 reaches about saturation to the desorption area 360. The temperature of the one of the adsorbent material module 100 is increased in the desorption area 360 so as to proceed with the desorption and regeneration action. When the desorption and regeneration action of the one of the adsorbent material module 100 located in the desorption area 360 is completed and is moved to the pre-cooling area 370 to reduce the temperature thereof. Pre-cooling area 370 can also equip with a cool wind fan (not show) to help decrease temperature quickly. Therefore, the one of the adsorbent material module 100 returns to the temperature that is easy to adsorb, and the one of the adsorbent material module 100 can be rotated to the adsorption area 350 to proceed with the adsorption action again.

It can be understood that each of the adsorbent material modules 100 is rotated by the adsorption device 300 to proceed with the adsorption action, the desorption and regeneration action and cooling action sequentially and cyclically. Therefore, the adsorption device 300 can proceed with the adsorption action and the desorption and regeneration action simultaneously and can produce the product gas P continuously, and it is beneficial for increasing the production rate of product gas P.

In order to achieve different operation requirements of the adsorption device 300, the adsorbent material modules 100 disposed on the adsorption device 300 can include the tubular adsorbent material 110A shown in FIG. 3A, the tubular adsorbent material 110B shown in FIG. 3B or the tubular adsorbent material 110C shown in FIG. 3C. Therefore, the temperature of the adsorbent material modules 100 can be increased by different heating methods, and the flexibility of using the adsorption device 300 can be improved.

Further, with the arrangement of the medium materials 150 (shown in FIG. 2) located on two ends of the adsorbent material modules 100, the adsorbent material modules 100 can directly connect to a power supply device (not shown) or a heat source (not shown) to proceed with the desorption regeneration action. Therefore, the operation of the adsorption device 300 can be more flexible and convenient. The embodiment of FIG. 8 takes the medium materials 150 of FIG. 2 having the thermal conductivity function as an example, but the present disclosure will not be limited thereto.

In order to exhaust an adsorbed gas A generated by the desorption and the regeneration action of the adsorbent material module 100 in the desorption area 360, the adsorption device 300 can include an exhausting cover 330. The exhausting cover 330 exhausts the adsorbed gas A of the desorption area 360 via a suction pipe 331.

In addition, each of the adsorbent material modules 100 is connected to a frame 310, and the outer of each of the adsorbent material modules 100 is cover by the frame 310. The frame 310 is detachably disposed on the outer frame 320, so that the adsorbent material modules 100 can be replaced with the adsorption device 300 more conveniently.

Figure 9:
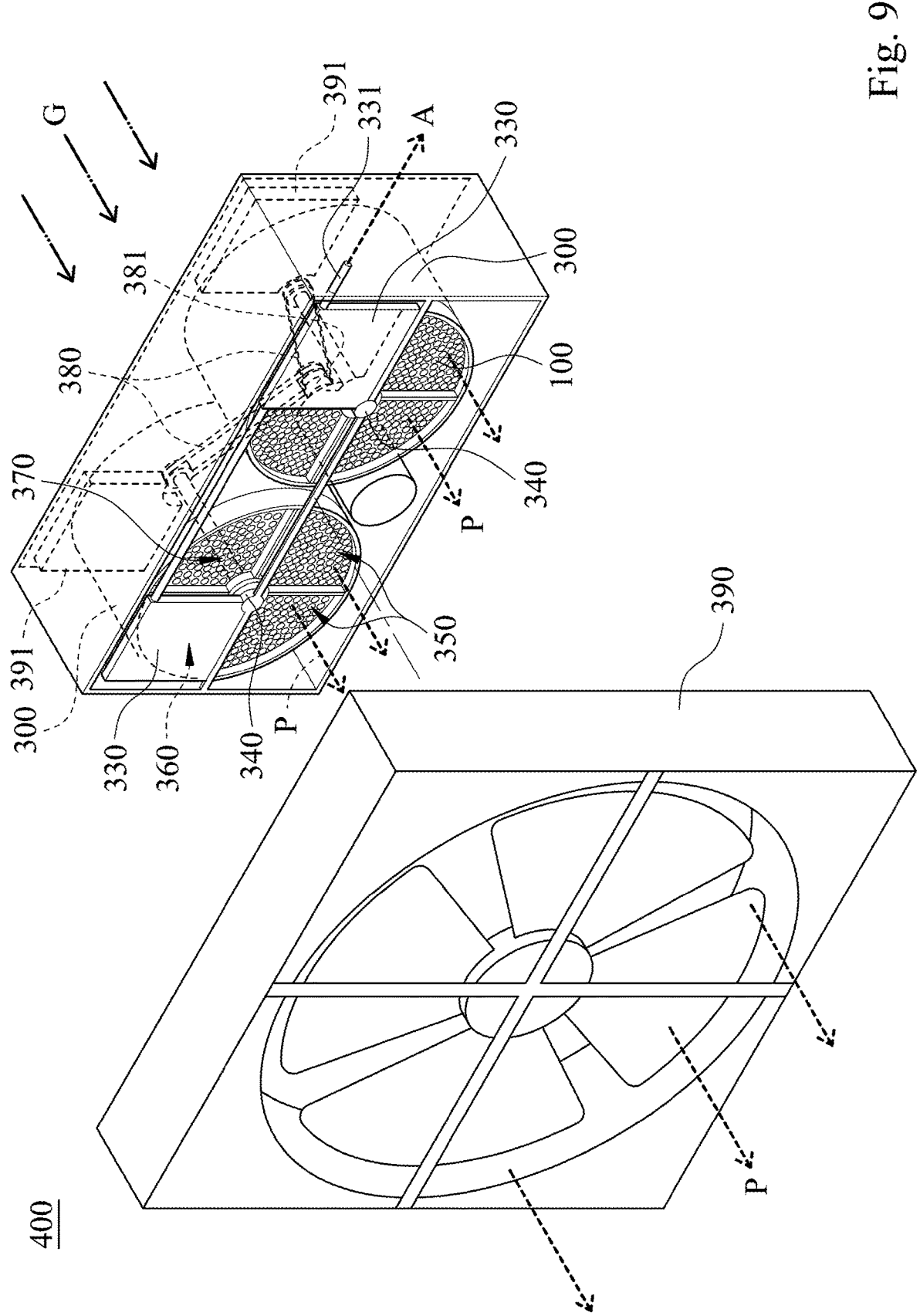
FIG. 9 is a schematic view of an adsorption device according to another embodiment of still another aspect of present disclosure.

FIG. 9 is a schematic view of an adsorption device 400 according to another embodiment of still another aspect of present disclosure. Specifically, in the embodiment of FIG. 9, the adsorption device 400 is composed of two adsorption devices 300 of the embodiment of FIG. 8, but the number of the adsorption device 300 will not be limited thereto. The details of the same structure, please refer to the embodiment of FIG. 8, and will not be described herein again.

In detail, each of the adsorption devices 300 includes a gear belt 380, and the gear belts 380 are connected to the motor 381. The two adsorption devices 300 are simultaneously linked by the rotation of the motor 381, and the adsorbent material modules 100 of each adsorption device 300 can sequentially perform the adsorption action, the desorption and regeneration action and the cooling action, respectively. Therefore, the operation efficiency of the adsorption device 400 can be enhanced by operating two adsorption devices 300 at the same time.

Further, the adsorption device 400 can further include a fan system 390 for drawing the mixed gases G pass through the adsorption device 400, and the flowrate of the mixed gases G passed through the adsorption device 400 can be adjusted by controlling the speed of the fan system 390.

In order to exhaust the adsorbed gas A generated by the desorption and regeneration action of the adsorbent material modules 100, the adsorption device 400 can further include exhausting covers 330. The exhausting covers 330 are disposed on one side of the desorption area 360 of each adsorption device 300. The exhausting covers 330 of each adsorption device 300 are communicated with each other. The exhausting covers 330 exhaust the adsorbed gas A out of the adsorption device 400 via the suction pipe 331.

The adsorption device 400 can further include two fans 391, the fans 391 are disposed on another side of the desorption area 360 of each adsorption device 300, respectively, and for controlling the flow of the mixed gases G passed through the desorption area 360. Further, the fans 391 can be equipped with a heat source device (not shown) according to the operation requirements to heat the adsorbent material module 100 located at the desorption area 360. For example, when the tubular adsorbent materials (not shown in FIG. 9) of each of the adsorbent material modules 100 of each adsorption device 300 include the conductive layers (not shown in FIG. 9) having the thermal conductivity function, each of the adsorbent material modules 100 of each adsorption device 300 can be heated by the heat source device, the temperature of the tubular adsorbent materials can be evenly increased via the conductive layers having the thermal conductivity function, and it is favorable for operating the desorption and regeneration action of the adsorbent material module 100 located at the desorption area 360.

The temperature of the adsorbent material modules 100 of the adsorption device 400 can be increased by heating the mixed gases G or a clean air. Specifically, the fans 391 draws a certain flow of the mixed gases G or the clean air into the desorption area 360, and at the same time, the fans 391 heats the mixed gases G or the clean air. The temperature of the tubular adsorbent materials can be increased by the heated mixed gases G or the heated clean air passing through the tubular adsorbent materials of the adsorbent material module 100 located at the desorption area 360, so as to regenerate the adsorbent material module 100 located at the desorption area 360 in high temperature. Therefore, the temperature of the adsorbent material module 100 located at the desorption area 360 can be increased in different way, so that the flexibility of the application of the adsorption device 400 can be enhanced.

Figure 10:
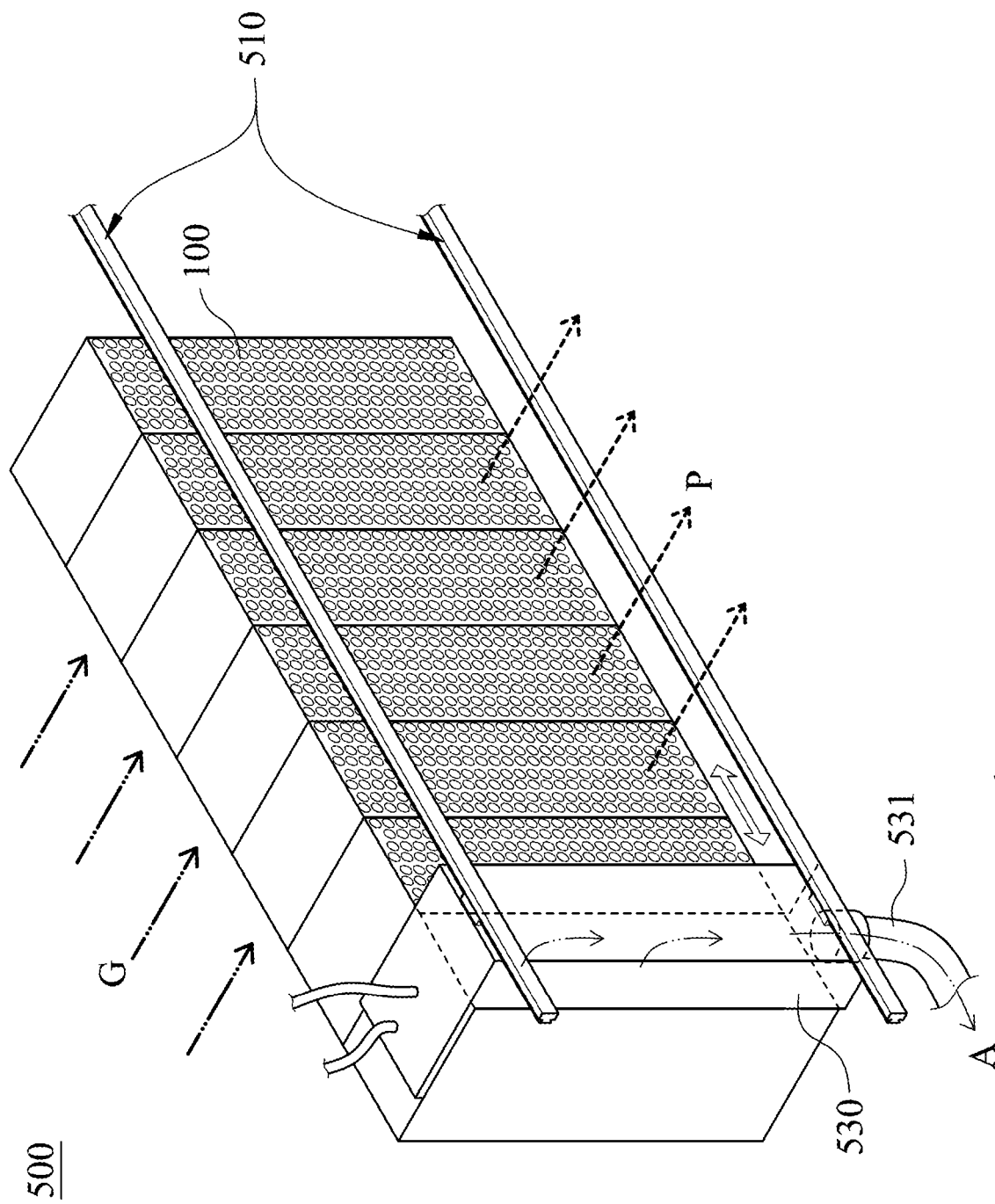
FIG. 10 is a schematic view of an adsorption device according to further another embodiment of still another aspect of present disclosure.

FIG. 10 is a schematic view of an adsorption device 500 according to further another embodiment of still another aspect of present disclosure. The adsorption device 500 includes a plurality of adsorbent material modules 100 connected to each other, and each of the adsorbent material modules 100 proceeds with an adsorption action and a desorption and regeneration action alternately and respectively. It should be mentioned that, in another aspect, the adsorption device 500 can also include the adsorbent material structure 200 in FIG. 4, the user can select and configure according to the operation requirements, and the present disclosure will not be limited thereto.

In detail, in FIG. 10, the adsorption device 500 can include slide rails 510 and exhausting cover 530, wherein the exhausting cover 530 is movably connected to the slide rails 510. The exhausting cover 530 can be moved by the slide rails 510 and so as to regenerate the adsorbent material modules. Therefore, the adsorption device 500 can proceed with the adsorption action and the desorption and regeneration action at the same time.

Specifically, the mixed gases G are blew by a gas supply (not shown) or are drawn by a fan system (not shown) and are passed through the adsorption device 500. The adsorbent material modules 100 adsorb the target gas in the mixed gases G and generate the product gas P. The exhausting cover 530 is moved to the adsorbent material module 100 which is about saturated through the slide rails 510. The exhausting cover 530 heats the aforementioned adsorbent material module 100 by increasing the temperature thereof, and so as to regenerate the aforementioned adsorbent material module 100.

In FIG. 10, each of the adsorbent material modules 100 includes the medium materials (not shown in FIG. 10) with the electrical conductivity function and are located on two ends of each of the adsorbent material modules 100, and each of the tubular adsorbent materials (its reference numeral is omitted) includes the conductive layer (not shown in FIG. 10) with the electrical conductivity function. Hence, when the power supply device electrifies the adsorbent material modules 100, by the arrangement of the medium materials with the electrical conductivity function and the conductive layers with the electrical conductivity function, the temperature of the adsorbent material modules 100 can be evenly increased, and the adsorbent material modules 100 can perform the desorption and regeneration action more efficiently.

In order to exhaust the adsorbed gas A generated by the desorption regeneration action of the adsorbent material modules 100 out the adsorption device 500, the exhausting cover 530 can include a suction pipe 531. The exhausting cover 530 isolates the adsorbed gas A from the product gas P, and the adsorbed gas A is exhausted out the adsorption device 500 through the suction pipe 531.

After the desorption and regeneration action is completed, the exhausting cover 530 is moved to another adsorbent material module 100 which needs to proceed with the desorption and regeneration action via the slide rails 510. Therefore, the adsorption device 500 can generate the product gas P continuously.

Further, each of the adsorbent material modules 100 is connected to a frame (not shown), and the adsorbent material modules 100 can detachably connect to each other, so that the adsorbent material modules 100 can be replaced on the adsorption device 500 more conveniently, and the practicality of the adsorption device 500 can be enhanced.

Figure 11:
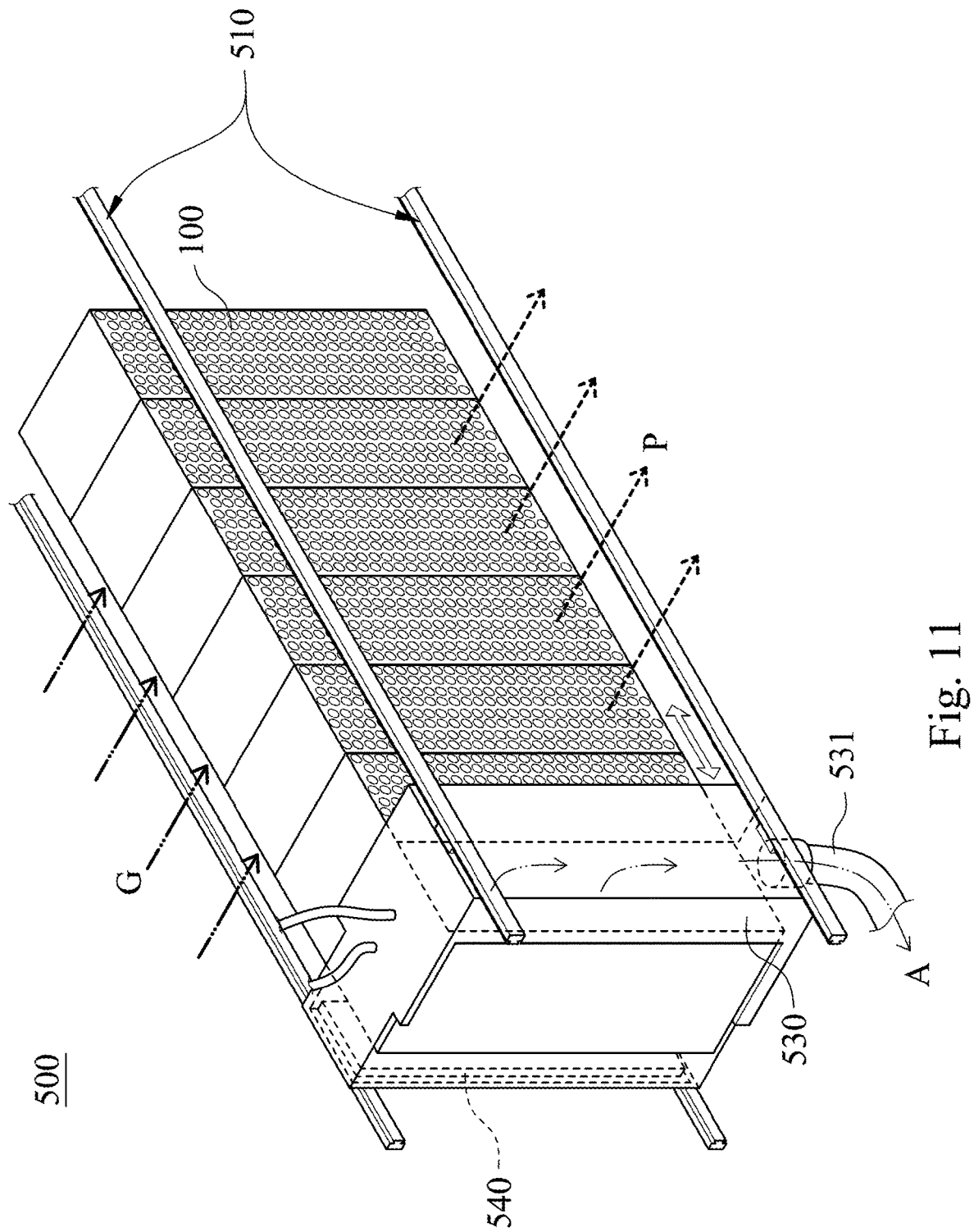
FIG. 11 is a schematic view of an adsorption device according to still another embodiment of still another aspect of present disclosure.

FIG. 11 is a schematic view of an adsorption device 500 according to still another embodiment of still another aspect of present disclosure. The structure of the adsorption device 500 in FIG. 11 is similar to the structure of the adsorption device 500 in FIG. 10, the structural relationship and configuration of the same structure, please refer to FIG. 10, which will not be described again herein. In FIG. 11, the adsorption device 500 can further include a heat source device 540. The heat source device 540 is connected to one end of the exhausting cover 530, and the heat source device 540 can inlet with a clean air (not shown at FIG. 11). The heat source device 540 can heat the mixed gases G or the clean air passing through the adsorbent material modules 100.

Specifically, in FIG. 11, each of the adsorbent material modules 100 of the adsorption device 500 includes a medium materials (not shown in FIG. 11) with the thermal conductivity function located on two ends of each of the adsorbent material modules 100, and each of the tubular adsorbent materials (its reference numeral is omitted) includes the conductive layer (not shown in FIG. 11) with the thermal conductivity function. Hence, when the heat source device 540 heats the adsorbent material modules 100, by the arrangement of the medium materials with the thermal conductivity function and the conductive layers with the thermal conductivity function, the temperature of the adsorbent material modules 100 can be evenly increased, and the adsorbent material modules 100 can perform the desorption and regeneration action more efficiently.

The width of one end of the exhausting cover 530 can be greater than the width of each of the adsorbent material modules 100, and the exhausting cover 530 can be hermetically connected to each of the adsorbent material modules 100. Therefore, it is favorable for avoiding the adsorbed gas A escaping, and the purity of the product gas P can be enhanced.

The temperature of the adsorbent material modules 100 of the adsorption device 500 can be increased by heating the mixed gases G or the clean air. Specifically, the mixed gases G or the clean air can be heated by the heat source device 540, and the temperature of the adsorbent material modules 100 can be increased by the mixed gases G or the clean air with high temperature.

With above arrangement, the adsorption device 500 can be used with different types of the heat source device 540 and different heating methods to match with different types of the adsorbent material modules 100, and the flexibility and practicability of the adsorption device 500 can be enhanced.

Figure 12:
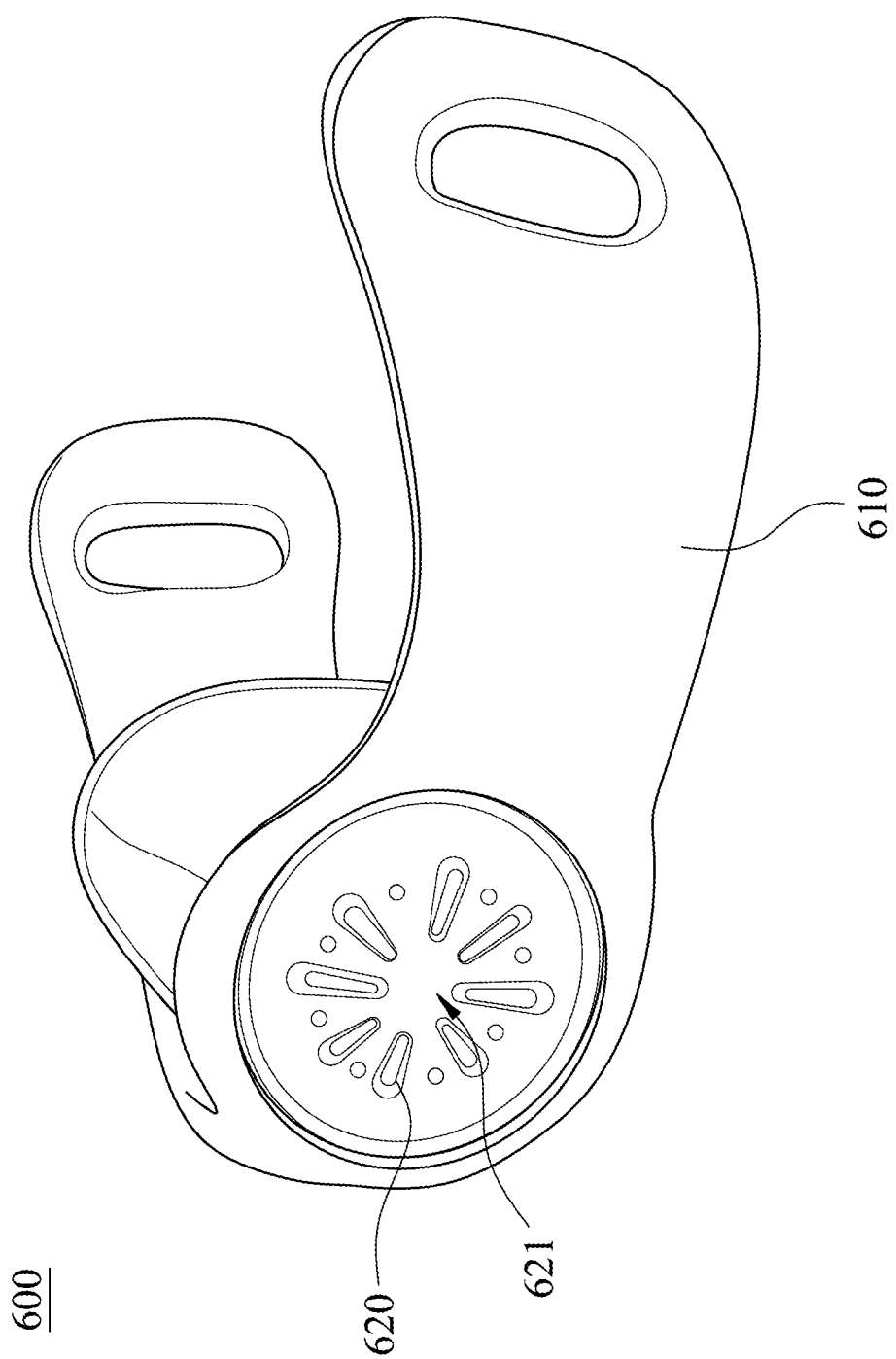
FIG. 12 is a schematic view of a gas filtration mask according to one embodiment of yet another aspect of present disclosure.
Figure 13:
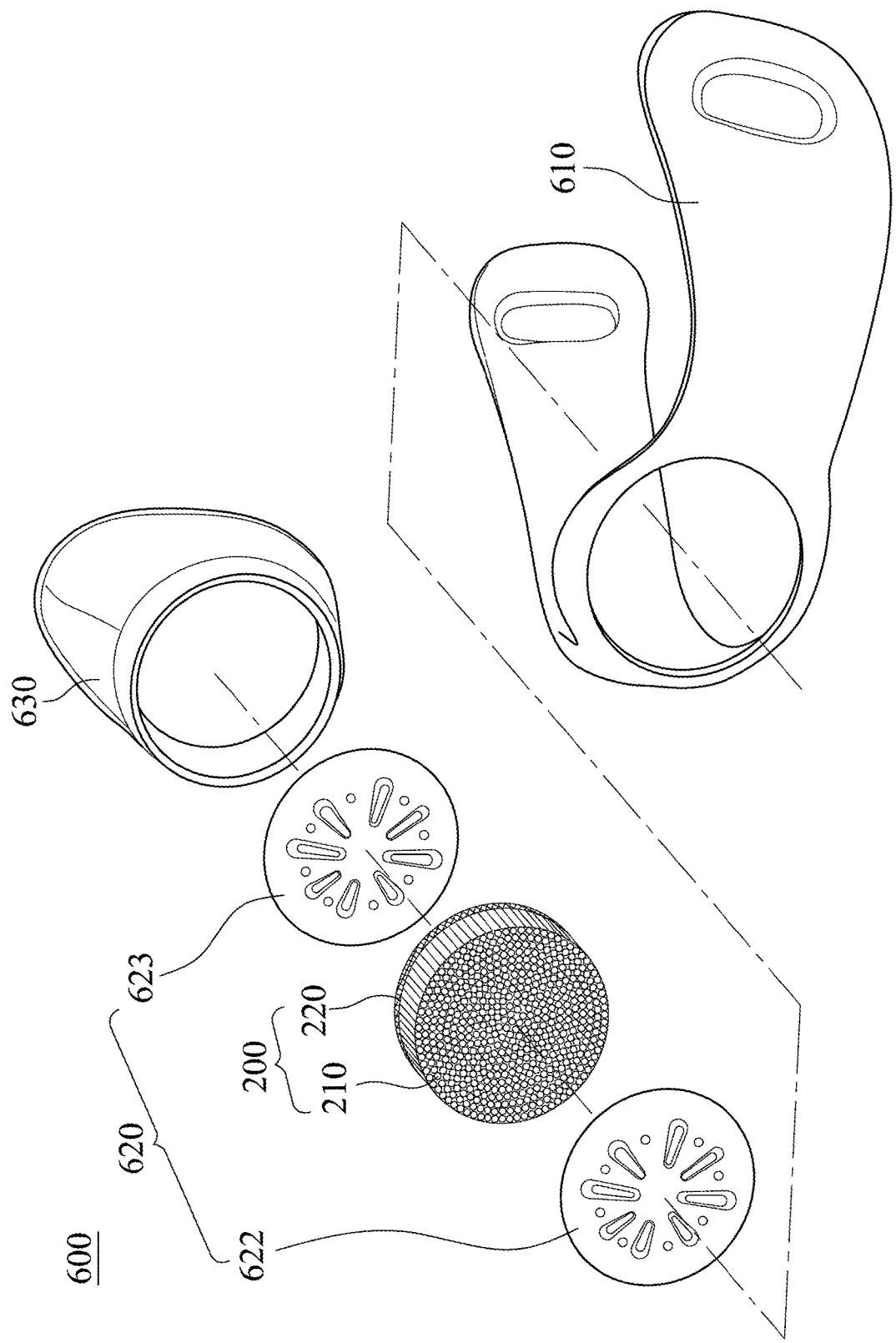
FIG. 13 is an exploded view of the gas filtration mask of FIG. 12.

FIG. 12 is a schematic view of a gas filtration mask 600 according to one embodiment of yet another aspect of present disclosure. FIG. 13 is an exploded view of the gas filtration mask 600 of FIG. 12.

The gas filtration mask 600 includes a wearing part 610 and a cartridge 620, and the cartridge 620 is separately connected to the wearing part 610. The cartridge 620 has an accommodation space 621 and includes the adsorbent material module 100 of FIG. 1A or the adsorbent material structure 200 of FIG. 4. The user can choose to arrange the adsorbent material module 100 or the adsorbent material structure 200 according to the operation requirements. The following will takes the gas filtration mask 600 with the adsorbent material structure 200 as an example.

The adsorbent material structure 200 is disposed in the accommodation space 621. When the user wears the gas filtration mask 600 via the wearing part 610 at the mouth and nose, the adsorbent material structure 200 in the cartridge 620 filters harmful substances from the air. The first adsorbent material module 210 and the second adsorbent material module 220 can adsorb different gas molecules or intercept and capture particles of different sizes or types, such as, dust, particulate matter and other solid types of harmful substances. The first adsorbent material module 210 and the second adsorbent material module 220 can also adsorb gas molecules through each adsorbent layer, the characteristics of each adsorbent layer can be adjusted according to requirements, and the gas filtration mask 600 can adsorb isopropyl alcohol, acetone, butane, carbon dioxide, water vapor and other gases, but the present disclosure will not be limited thereto.

Further, the cartridge 620 includes an outer cover 622, inner cover 623 and a connecting part 630. The outer cover 622 and inner cover 623 fix the adsorbent material structure 200 in the accommodation space 621. It should be mentioned that the cartridge 620 is detachably connected to the gas filtration mask 600 through the connecting part 630, therefore, when the adsorbent material structure 200 in the cartridge 620 reaches about saturation, the cartridge 620 can be removed and replaced from the gas filtration mask 600, and the purpose of convenient and sustainable use can be achieved.

With the above arrangement, the problem of the high pressure drop of the conventional gas filtration mask can be solved. With the characteristics of high mass transfer rate and high adsorption rate of the first adsorbent material module 210 and the second adsorbent material module 220, the gas processing efficiency of the gas filtration mask 600 can be increased and the replacement rate thereof can be also reduced. Therefore, the practicality of the gas filtration mask 600 can be improved.

In order to more clearly explain the advantages of the adsorbent material module 100 and the adsorbent material structure 200 of the present disclosure, the adsorbent material module 100 and the second adsorbent material module 220 of the adsorbent material structure 200 are performed adsorption tests of Example 1 and Example 2, respectively. In Example 1 and Example 2, the adsorbent material module 100 can include the tubular adsorbent materials with a single channel (such as the tubular adsorbent materials 110A in FIG. 3A) or the tubular adsorbent materials with multi-channels (such as the tubular adsorbent materials 110C in FIG. 3C), and the second adsorbent material module 220 can include the fiber adsorbent materials (such as the fiber adsorbent materials 221 in FIG. 6B).

In detail, each of the adsorbent material modules 100 and the second adsorbent material module 220 adsorb the isopropyl alcohol (IPA) and the breakthrough curve by time and the percentage of the ratio of measured IPA concentration to initial IPA concentration ($C/C_{initial}$). The adsorption capacity ($g_{IPA}/g_{Fibre}$) of each of the adsorbent material modules 100 and the second adsorbent material module 220 were calculated upto the breakthrough point of 10%. The test condition is 300 ppm IPA as $CH_4$ and the air volume is 30 L/min. Table 1 lists the experimental data of Example 1 and Example 2.

According to the experimental data of Example 1 and Example 2 in Table 1, when adsorbing isopropyl alcohol, the adsorption capacity of the adsorbent material modules 100 can reach 0.7±0.03 wt % to 1.55±0.14 wt % upto the breakthrough point of 10%. It means that the adsorbent material modules 100 of the present disclosure exhibit good adsorption performance.

Further, shown as the experimental data of Example 2, the adsorption capacity of the second adsorbent material module 220 including the fiber adsorbent materials 221 is better than the adsorption capacity of the adsorbent material module 100. It means that the second adsorbent material module 220 including the fiber adsorbent materials 221 is beneficial to increase the adsorption efficiency of the adsorbent material structure 200.

TABLE 1

| Example | Adsorbent material module 100 or second adsorbent material module 220 | Adsorption capacity upto breakthrough point of 10% (wt %) |
| --- | --- | --- |
| Example 1 | Single channel (tubular adsorbent materials 110A) | 0.7 ± 0.03 |
|  | Multi-channel (tubular adsorbent materials 110C) | 1.55 ± 0.14 |
|  | Fiber (fiber adsorbent materials 221) | 1.94 ± 0.03 |
| Example 2 | Multi-channel (tubular adsorbent materials 110C) | 2.90 ± 0.16 |
|  | Fiber (fiber adsorbent materials 221) | 6.37 ± 0.30 |

In addition, in order to explain the advantages of the adsorbent material module 100 and the adsorbent material structure 200 of the present disclosure more clearly, the adsorbent material module 100 and the adsorbent material structure 200 adsorb different target substances for adsorption test, respectively. In detail, the adsorbent material module 100 and the adsorbent material structure 200 adsorb isopropyl alcohol, Acetone, TVOC1 and Toluene, respectively, and the removal efficiency after adsorption are calculated. The test condition of the test is that an inlet flowrate is 3.2 m/sec with different target-pollutants. Table 2 lists the removal efficiency of the adsorbent material module 100 and the adsorbent material structure 200 filtering the target substances in the gas.

According to Table 2, the removal efficiency of the adsorbent material module 100 and the adsorbent material structure 200 for different target substances can reach 86.4% to 99%. Further, the removal efficiency of the adsorbent material structure 200 is better than the removal efficiency of the adsorbent material module 100, that is, the fiber adsorbent materials 221 can further enhance the adsorption efficiency of the adsorbent material structure 200 of present disclosure.

It should be mentioned that the removal efficiency of the adsorbent material structure 200 can be 96% to 99%, which is better than the removal efficiency of the conventional adsorbent materials. Therefore, the adsorbent material structure 200 can be widely used in the field of micro-pollution (ppb level to ppm level) prevention, and favorable for expanding the application fields of the gas filtration mask 600.

TABLE 2

| | Adsorbent material module 100 | | | Adsorbent material structure 200 | | |
| --- | --- | --- | --- | --- | --- | --- |
| Target substances | 100 mm Inlet (ug/m³) | 100 mm Outlet (ug/m³) | Removal efficiency (%) | 100 mm Inlet (ug/m³) | 100 mm Outlet (ug/m³) | Removal efficiency (%) |
| IPA | 19 | 0.6 | 96.8 | 20.8 | 0.4 | 98.1 |
| Acetone | 20 | 2.3 | 88.5 | 13.8 | <0.1 | >99 |
| TVOC1 | 33 | 2.8 | 91.5 | 34 | 0.4 | 98.8 |
| Toluene | 2.2 | 0.3 | 86.4 | 2.3 | <0.1 | >96 |

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. An adsorbent material module, comprising:
   a plurality of tubular adsorbent materials, each of the tubular adsorbent materials comprising:
     at least one channel; and
     at least one adsorbent layer surrounding the at least one channel;
   a plurality of medium materials coated on two ends of each of the tubular adsorbent materials, respectively, and the medium materials have a thermal conductivity function or an electrical conductivity function; and
   at least one conductive layer surrounding the at least one adsorbent layer, wherein the at least one conductive layer has the thermal conductivity function or the electrical conductivity function.

2. The adsorbent material module of claim 1, wherein an inner diameter of the at least one channel of each of the tubular adsorbent materials is 0.2 mm to 4.0 mm.

3. The adsorbent material module of claim 1, wherein the at least one conductive layer is made of an activated carbon, a carbon black, a graphene, a graphite, a metal oxide or a metallic-based material.

4. The adsorbent material module of claim 1, wherein each of the tubular adsorbent materials further comprises at least one insulating layer surrounding the at least one conductive layer.

5. The adsorbent material module of claim 1, wherein the at least one adsorbent layer of each of the tubular adsorbent materials is made of a boron-group material, a carbon-group material, a nitrogen-group material, an activated carbon, a 13X zeolite, a silica gel, an aerogel, a LiLSX molecular sieve, a carbon molecular sieve, a type A molecular sieve, a type X molecular sieve, a type Y molecular sieve, an activated alumina oxide, a high silica zeolite, a mesoporous silica zeolite, a metal-organic framework, a covalent organic framework, a metal oxide, a bentonite, a mordenite zeolite or a sepiolite.

6. The adsorbent material module of claim 1, wherein the adsorbent material module is for adsorbing water, oxygen, nitrogen, carbon dioxide, VOCs, $CH_4$, $NO_x$, $SO_x$, $C_xF$, oil gas, ester or amines.

7. The adsorbent material module of claim 1, wherein the adsorbent material module is for sound absorption, sound insulation, sound frequency response or thermal insulation.

8. An adsorbent material structure, comprising:
at least one first adsorbent material module, comprising a plurality of tubular adsorbent materials which are arranged side by side, and each of the tubular adsorbent materials comprising:
at least one channel; and
at least one first adsorbent layer surrounding the at least one channel; and
at least one second adsorbent material module connected to the at least one first adsorbent material module and comprising a plurality of fiber adsorbent materials which are winded and stacked to each other, wherein each of the fiber adsorbent materials comprises:
at least one micro channel; and
at least one second adsorbent layer surrounding the at least one micro channel;
wherein an outer diameter of each of the tubular adsorbent materials is greater than an outer diameter of each of the fiber adsorbent materials, and an arranging direction of the tubular adsorbent materials of the at least one first adsorbent material module is perpendicular to an arranging direction of the fiber adsorbent materials of the at least one second adsorbent material module.

9. The adsorbent material structure of claim 8, wherein an inner diameter of the at least one channel of each of the tubular adsorbent materials is 0.2 mm to 4.0 mm.

10. The adsorbent material structure of claim 8, wherein an inner diameter of the at least one micro channel of each of the fiber adsorbent materials is 0.01 mm to 0.2 mm.

11. The adsorbent material structure of claim 8, wherein each of the tubular adsorbent materials further comprises at least one first conductive layer surrounding the at least one first adsorbent layer, and each of the fiber adsorbent materials further comprises at least one second conductive layer surrounding the at least one second adsorbent layer;
wherein the at least one first conductive layer and the at least one second conductive layer have a thermal conductivity function or an electrical conductivity function.

12. The adsorbent material structure of claim 11, wherein the at least one first conductive layer of each of the tubular adsorbent materials and the at least one second conductive layer of each of the fiber adsorbent materials are made of an activated carbon, a carbon black, a graphene, a graphite, a metal oxide or a metallic-based material.

13. The adsorbent material structure of claim 11, wherein each of the tubular adsorbent materials further comprises at least one first insulating layer surrounding the at least one first conductive layer, and each of the fiber adsorbent materials further comprises at least one second insulating layer surrounding the at least one second conductive layer.

14. The adsorbent material structure of claim 8, wherein the at least one first adsorbent layer of each of the tubular adsorbent materials and the at least one second adsorbent layer of each of the fiber adsorbent materials are made of a boron-group material, a carbon-group material, a nitrogen-group material, an activated carbon, a 13X zeolite, a silica gel, an aerogel, a LiLSX molecular sieve, a carbon molecular sieve, a type A molecular sieve, a type X molecular sieve, a type Y molecular sieve, an activated alumina oxide, a high silica zeolite, a mesoporous silica zeolite, a metal-organic framework, a covalent organic framework, a metal oxide, a bentonite, a mordenite zeolite or a sepiolite.

15. The adsorbent material structure of claim 8, wherein the at least one first adsorbent material module and the at least one second adsorbent material module are for adsorbing water, oxygen, nitrogen, carbon dioxide, VOCs, $CH_4$, $NO_x$, $SO_x$, $C_xF$, oil gas, ester or amines.

16. The adsorbent material structure of claim 8, wherein the at least one first adsorbent material module and the at least one second adsorbent material module are for sound absorption, sound insulation or thermal insulation.

17. The adsorbent material structure of claim 8, wherein the at least one first adsorbent material module further comprises:
a plurality of first medium materials coated on two ends of the first adsorbent material module;
the at least one second adsorbent material module further comprises:
a plurality of second medium materials coated on an outer surface of the second adsorbent material module;
wherein the first medium materials and the second medium materials have a thermal conductivity function or an electrical conductivity function.

18. The adsorbent material structure of claim 8, wherein an outer diameter of each of the tubular adsorbent materials is D1, an outer diameter of each of the fiber adsorbent materials is D2, and D1/D2>3.

19. A gas filtration mask, comprising:
a wearing part; and
a cartridge having an accommodation space and separately connected to the wearing part, and the cartridge comprising the adsorbent material module of claim 1.

20. A gas filtration mask, comprising:
a wearing part; and
a cartridge having an accommodation space and separately connected to the wearing part, and the cartridge comprising the adsorbent material structure of claim 8.

* * * * *